(12) United States Patent
Allen

(10) Patent No.: US 6,266,154 B1
(45) Date of Patent: Jul. 24, 2001

(54) GRAYSCALE ENHANCEMENT SYSTEM AND METHOD

(75) Inventor: Daniel J. Allen, Derry, NH (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/082,628

(22) Filed: May 21, 1998

(51) Int. Cl.$^7$ .................................................. H04N 1/405
(52) U.S. Cl. ........................... 358/1.9; 358/458; 358/459
(58) Field of Search ........................... 358/1.9, 459, 458, 358/456, 455, 466, 298; 382/205, 237, 270

(56) References Cited

U.S. PATENT DOCUMENTS

| | | | |
|---|---|---|---|
| 5,504,462 | * 4/1996 | Clanciosi et al. | 345/148 |
| 5,533,150 | 7/1996 | Zulian | 382/275 |
| 5,659,399 | * 8/1997 | Lin et al. | 358/1.9 |
| 5,666,470 | * 9/1997 | Parker | 358/1.2 |
| 5,687,297 | * 11/1997 | Coonan et al. | 358/1.2 |
| 6,081,625 | * 6/2000 | Sakaue | 382/205 |

FOREIGN PATENT DOCUMENTS

| | | |
|---|---|---|
| 0 528 365 A2 | 2/1993 | (EP) . |
| 0 633 688 A2 | 1/1995 | (EP) . |
| 0740 457 A1 | 10/1996 | (EP) . |
| WO 89/08962 | 9/1989 | (WO) . |
| WO 95/02938 | 1/1995 | (WO) . |

OTHER PUBLICATIONS

Patent Cooperation Treaty, International Search Report, International Application No. PCT/US99/11344, mailed on Aug. 11, 1999, 6 pages.

* cited by examiner

*Primary Examiner*—Scott Rogers
(74) *Attorney, Agent, or Firm*—Testa, Hurwitz & Thibeault, LLP

(57) ABSTRACT

A grayscale enhancement system which operates on color or monochrome source halftone images to produce output halftone cells of the same visual weight but spatially distributed to reduce artifacts caused by limited grayscale levels. By operating upon a set of input halftone cells surrounding each output pixel cell with a set of logic operations implementing unique algorithms, the system re-distributes the weight of the halftone cells characterizing inferred-halftone cells. A rendering subsystem, responsive to the inferred-halftones, then produces signal for driving an output device to the best of the output device's ability.

24 Claims, 13 Drawing Sheets

HALF-TONE
EXAMPLE

TEXT OR LINE-ART
EXAMPLE

GRAYSCALE ENHANCEMENT SYSTEM AND METHOD

FIELD OF INVENTION

This invention relates to a grayscale enhancement method and system including a unique routine which eliminates or reduces the mottling effect of present halftoning techniques.

BACKGROUND OF INVENTION

Shades of gray on computer printers are achieved by a process called halftoning. In the halftoning process, halftone cells are created each including a number of pixels. By making all the pixels white, a white spot is created and, conversely, by making all the pixels black, a black spot is created. By making only a small percentage of the pixels black in a cell, the spot, to the eye, appears light gray and conversely by making a large percentage of the pixels black in a cell, the spot appears dark gray. In general, the number of gray levels available is a function of the number of pixels in a halftone cell.

However, a given printer's capacity is a function of the number of pixels per inch and the size of the halftone cell. For example, if a cell includes 9 pixels, there are 10 gray levels possible while if the cell includes 256 pixels, there are 257 possible gray levels. Thus, the finer the halftone screen, the fewer number of pixels in each cell and therefore the fewer gray levels available. So, a 600 dpi printer at a screen frequency of 200 lines per inch (lpi) has 10 possible gray levels while the same printer at a screen frequency of 120 lpi has 26 possible gray levels. Therefore, to achieve more gray levels, screen frequency and hence image resolution suffers.

So, the goal has been to increase the printer's image resolution on 600 dpi printers and achieve more gray levels at the same screen frequency. That is, a 600 dpi printer at 141 lpi results in 19 gray levels but with super dot techniques can produce 145 gray levels at 141 Ipi.

Even with such advancements in technology and the use of screen angling and spot spacing variation techniques, however, a phenomenon known as mottling occurs which makes photographic and other images appear to have bad complexions. See, in general, *Real World Scanning and Halftones*, Blatner and Roth (1993, Peachpit Press).

Current processes for correcting the mottling effect include techniques that unfortunately add significant storage requirements to the printer system.

SUMMARY OF INVENTION

It is therefore an object of this invention to provide a grayscale enhancement method and system which eliminates or reduces the mottling effect of present halftone techniques.

It is a further object of this invention to provide such a grayscale enhancement method and system which corrects the mottling artifact without adding to system storage requirements.

It is a further object of this invention to provide such a grayscale enhancement method and system which results in magazine quality printing using standard laser printers.

It is a further object of this invention to provide such a grayscale enhancement method and system which can be implemented in existing printer software and integrated with other text enhancement techniques to produce a total system for producing quality text, line art, and photo images.

It is a further object of this invention to provide such a grayscale enhancement method and system which does not require significant software modifications or increases in processing requirements for the printer controller.

It is a further object of this invention to provide such a grayscale enhancement method and system which does not add any significant cost to the printer controller.

This invention results from the realization that the mottling effect of current halftoning techniques can be corrected, not by techniques which add significant storage requirements to a printer's controller, but by replacing full size, widely spaced black pixels with closer spaced black pixels of a smaller size such that the total percentage of darkness is maintained but the spacing between the adjacent black pixels is reduced thereby eliminating or reducing the mottling effect of current halftoning techniques.

This invention features a grayscale enhancement method comprising the steps of analyzing the state of selected pixels surrounding a subject pixel in a bit map; determining the number of selected pixels including the subject pixel that are black; and printing, at a location corresponding to the location of the subject pixel in the bit map, a fractional pixel related in size to at least the computed number of pixels which are black.

The step of analyzing preferably includes generating a window which moves about the bit map. The window is typically nine by ten pixels in area. The selected surrounding pixels are usually located at a predetermined set of vectors with respect to the subject pixel within the window. The predetermined set of vectors then each have a length n, for example $3\sqrt{2}$ pixels and each vector preferably extends to a different corner of the window.

A number, e.g. 4=m pixels are selected as the surrounding pixels and printing includes driving a printer modulator to print a pixel of a size approximately $x/(m+1)$ where x is the number of black pixels present in the set including the m surrounding pixels and the subject pixel.

The grayscale enhancement method of this invention comprises analyzing the state of a plurality of pixels in a portion of a bit map; generating a number of fractional size pixels for each black pixel of the plurality; and printing the fractional size pixels. The plurality typically contains m pixels and each fractional size pixel has a size $1/m$. The number of fractional size pixels is then m.

The grayscale enhancement system of this invention includes means for analyzing the state of selected pixels surrounding a subject pixel in a bit map; means for determining, from the selected pixels and the subject pixel, the number of black pixels; and means for printing, at a location corresponding to the location of the subject pixel in the bit map, a fractional pixel related in size to at least the computed number of pixels which are black. The means for analyzing includes means for generating a window which moves about the bit map. The window is preferably nine by ten pixels in area. The means for analyzing further includes means for selecting surrounding pixels that are located at a predetermined set of vectors with respect to the subject pixel within the window. The predetermined set of vectors each have a length n, e.g. $3\sqrt{2}$ and each vector extends to a different corner of the window. Printing includes driving a printer modulator to print a pixel of a size approximately $x/(m+1)$ where x is the number of black pixels present in the set including m surrounding pixels and the subject pixel m may equal 4.

The grayscale enhancement system of this invention includes means for analyzing the state of a plurality of pixels in a portion of a bit map; means for generating a number of fractional size pixels for each black pixel of the plurality;

and means for printing the fractional size pixels. The plurality contains m pixels and each fractional size pixel has a size 1/m. The number of fractional size pixels is m.

DISCLOSURE OF PREFERRED EMBODIMENT

Other objects, features and advantages will occur to those skilled in the art from the following description of a preferred embodiment and the accompanying drawings, in which.

Figure 1:
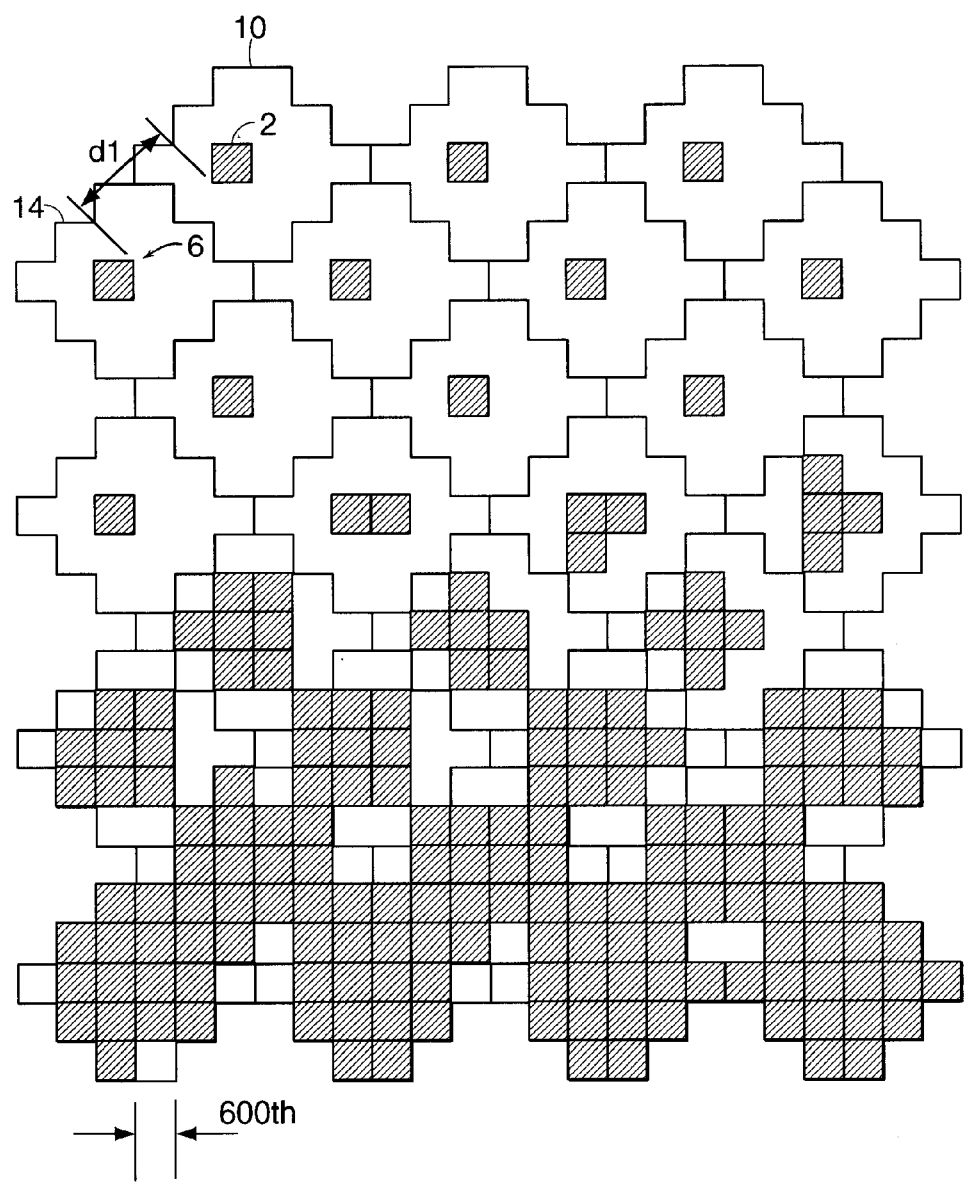
FIG. 1 is an illustration of prior art halftone cells used in conjunction with prior art halftoning techniques.

Halftone cell 10, FIG. 1 has one black pixel 2 out of 18 total pixels (a typical halftone dot for a 600 dpi laser printer with a frequency of 141 lpi) and adjacent halftone cell 14 also has single black pixel 6 out of 18 total pixels in accordance with the prior art. By adding additional black pixels in each cell, different shades of gray are achieved. In this example, there are 19 possible shades of gray as shown in FIG. 1.

Figure 2:
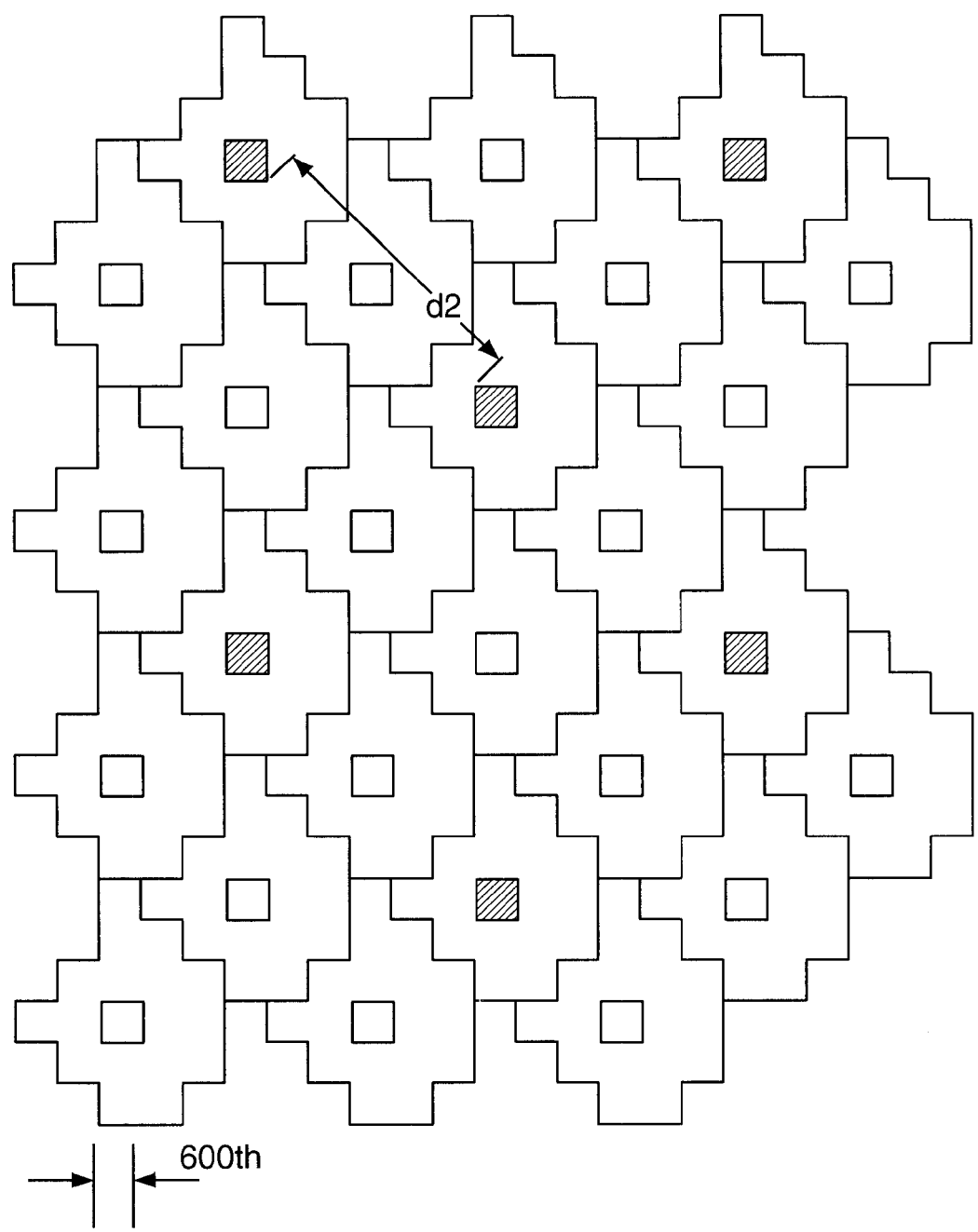
FIG. 2 is an illustration of prior art "super dot" halftone cells.

Additional gray shade levels are achieved in accordance with the prior art "super dot" methodology by combining four cells, FIG. 2. Groups of halftone dots are treated as a "super-dot" so that four dots with 18 bits each becomes a "super dot" with 72 bits and, theoretically, 73 shades of gray.

At the lighter shades of gray, however, the distance $d_2$ between black pixels 12 and 16 is twice the distance $d_1$ shown in FIG. 1 between black pixels 2 and 6. This large distance results in the mottling effect discussed in the Background of the Invention above. In summary, the "super dot" methodology, FIG. 2, adds additional shades of gray, but suffers from the mottling phenomenon at the lighter shades of gray.

A quite different approach to distribute the grays is shown in U.S. Pat. No. 5,533,150 in which an isolated black pixel is distributed into smaller sub-pixels, with a similar total weight, however the distribution is done within the same halftone cell. In this approach, only isolated pixels are treated, whereas the objective of the present invention is to not only modify the distribution of isolated black pixels but also distribute the weight of halftone cells comprised of several pixels of black. Further, the subject invention distributes the weight of these halftone dots over several halftone cells rather than within each cell therefore maintaining the true halftone relationship and therefore, increasing the number of gray levels. In contrast, the technique shown in U.S. Pat. No. 5,533,150 does not increase the number of gray levels.

Figure 3:
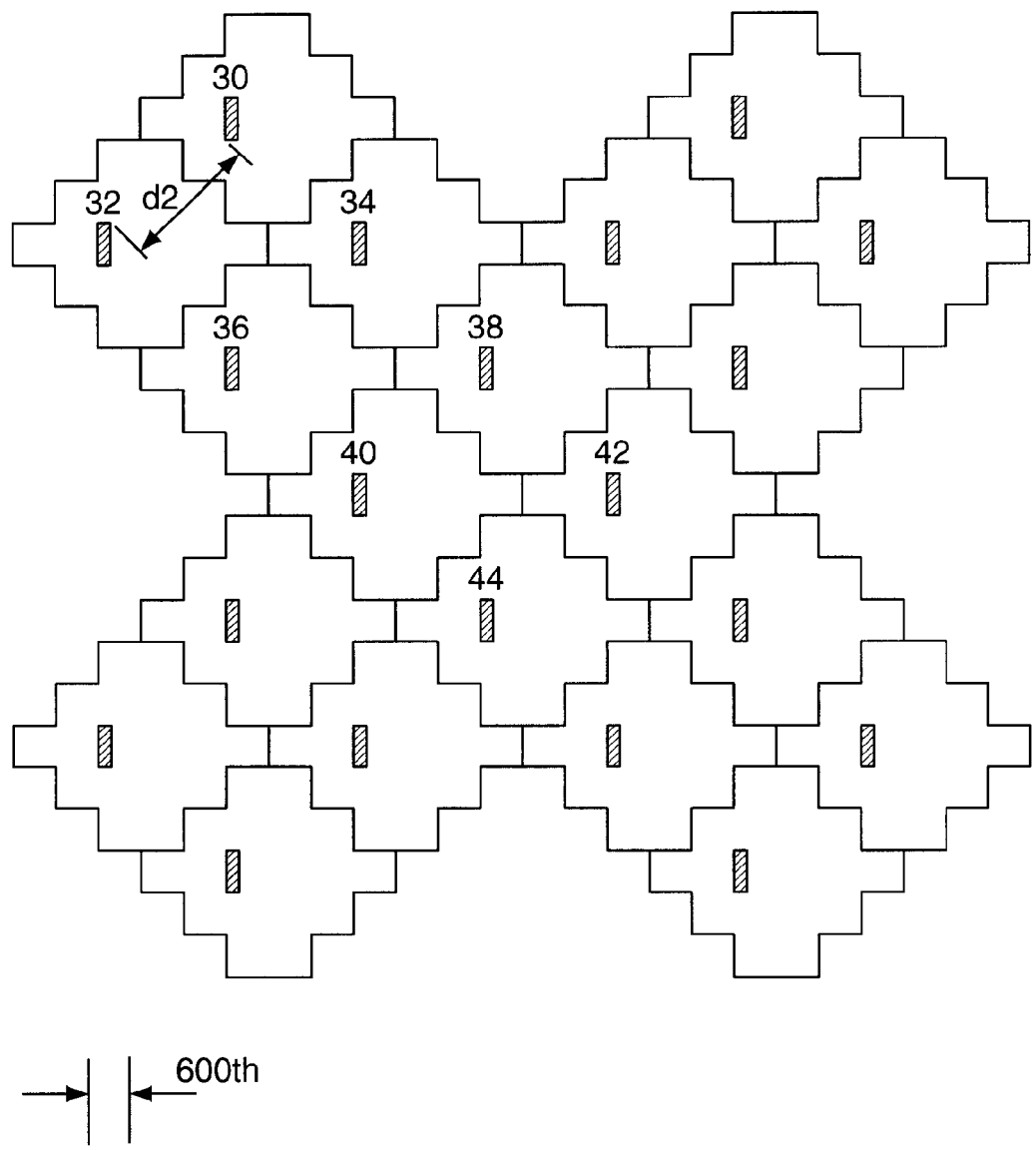
FIG. 3 is conceptual illustration of the result of using the grayscale enhancement method and system of this invention for lightest shade of gray.

As a conceptual matter, in this invention, however, full pixels 12 16, FIG. 2 are replaced with smaller, closer spaced 30, 32, 34, and 36; and 38, 40, 42, and 44, respectively, FIG. 3. Note that the distance $d_3$ between fractional size pixels 30 and 32 is significantly less than the distance $d_2$, FIG. 2, between full size pixels 12 and 16 and also that the gray level appears the same to the eye since fractional pixels 30–36, FIG. 3, are each one fourth the size of pixel 12, FIG. 2.

Figure 4:
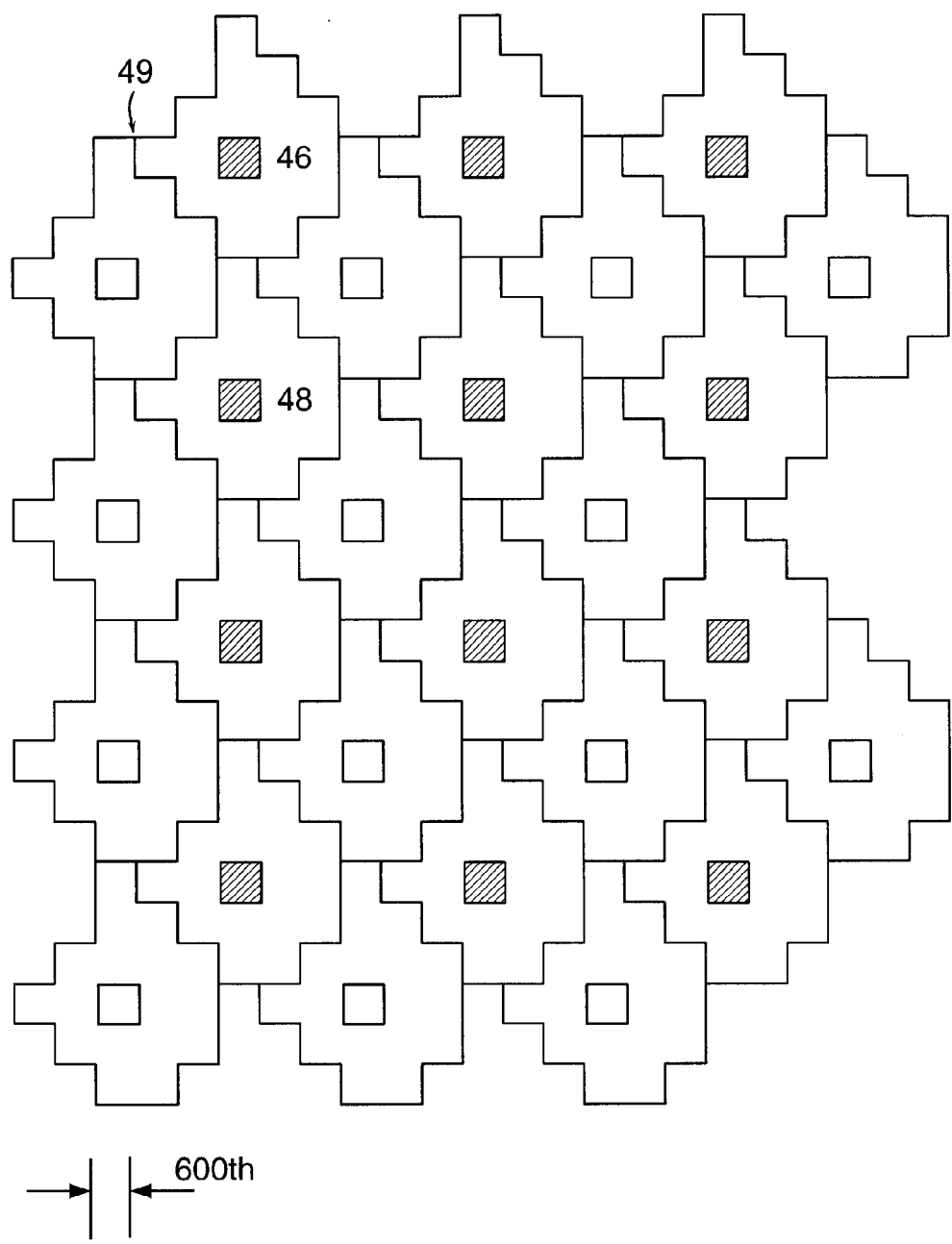
FIG. 4 is an illustration of a prior art darker shade of gray in a "super dot" halftone cell.
Figure 5:
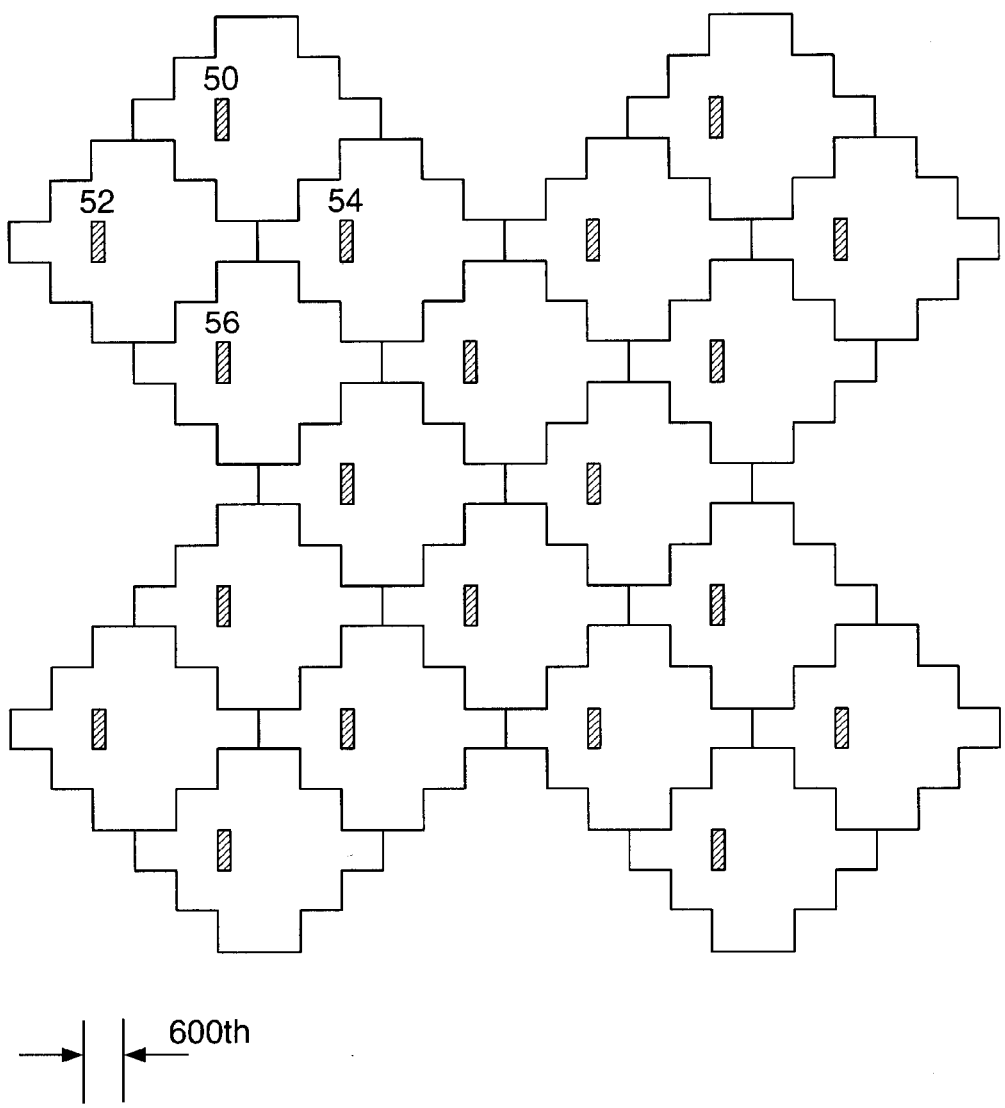
FIG. 5 is a conceptual illustration of the result of using the grayscale enhancement method and system of this invention for the shade of gray represented by the "super dot" halftone cell of FIG. 4.
Figure 6:
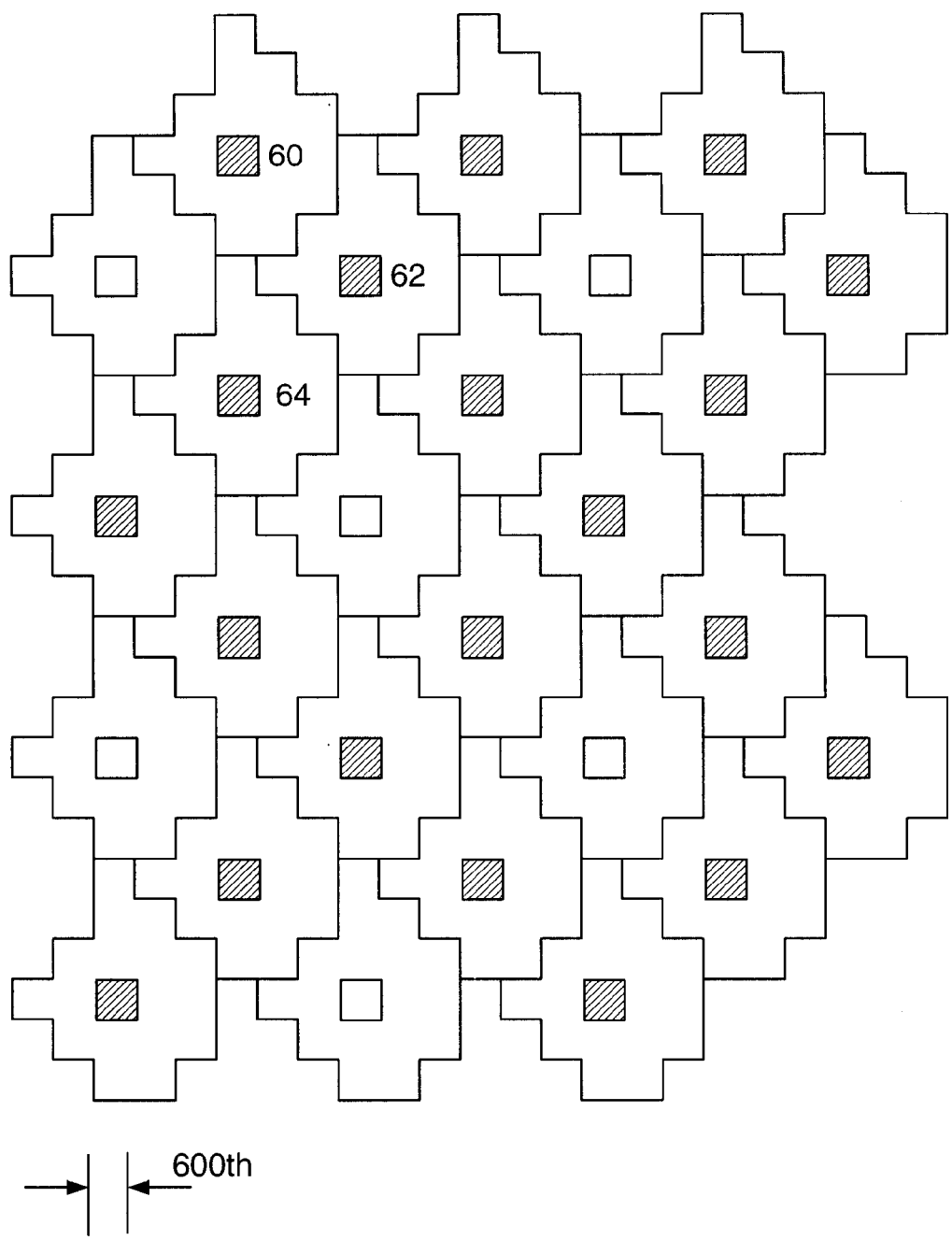
FIG. 6 is an illustration of still a darker shade of gray for a prior art "super dot" halftone cell.
Figure 7:
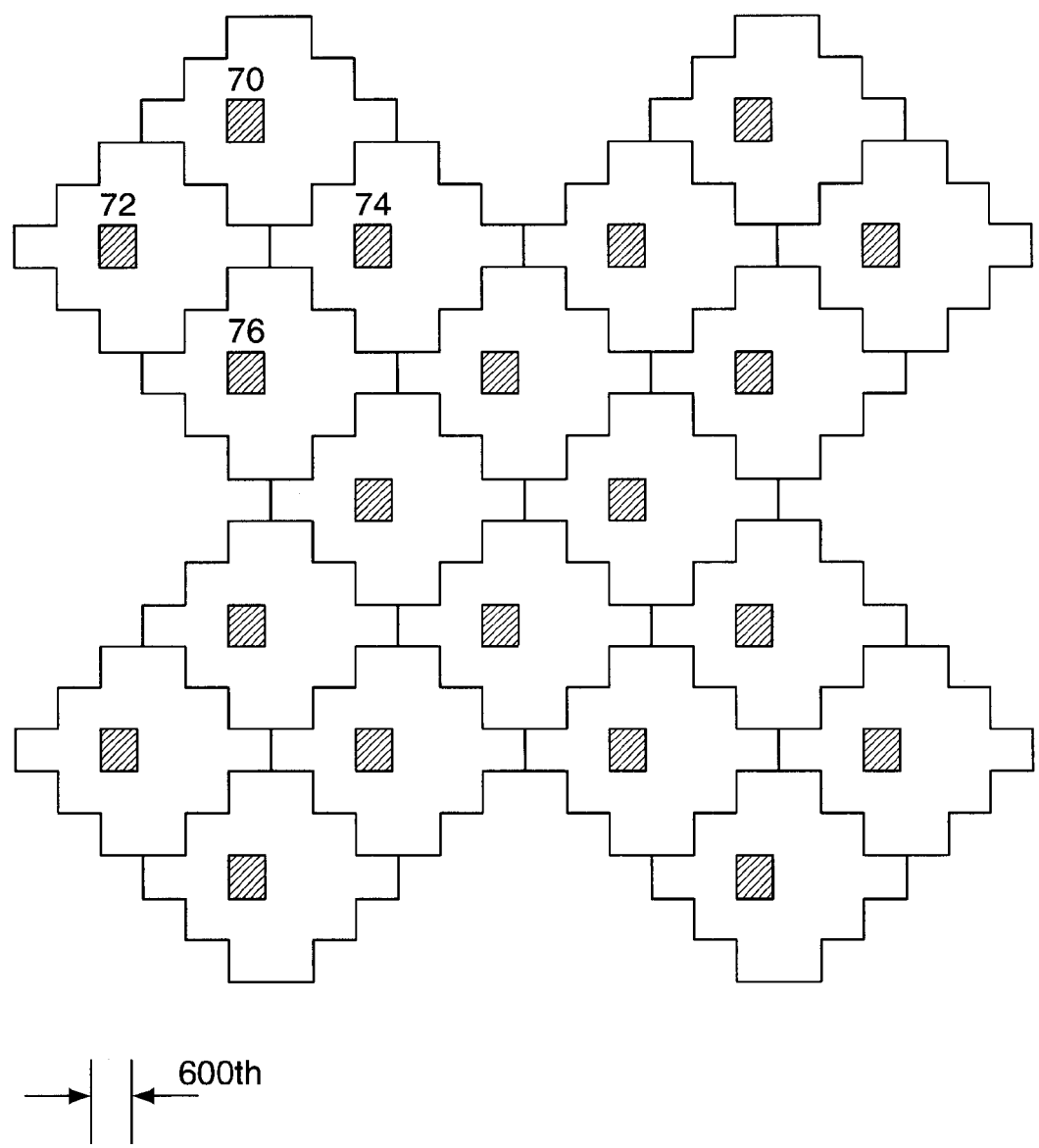
FIG. 7 is a conceptual illustration of the result of using the grayscale enhancement method and system of this invention for the prior art "super dot" halftone cell shown in FIG. 6.

For the next darker shade of gray, FIG. 4, full size black pixels 46 and 48, FIG. 4 in halftone cell 49 are replace with fractional half size pixels 50, 52, 54, and 56, FIG. 5. For the next darker shade of gray, FIG. 6, full size black pixels 60, 62, and 64 are replaced with fractional three quarter size pixels 70, 72, 74, and 76, FIG. 7.

Figure 8:
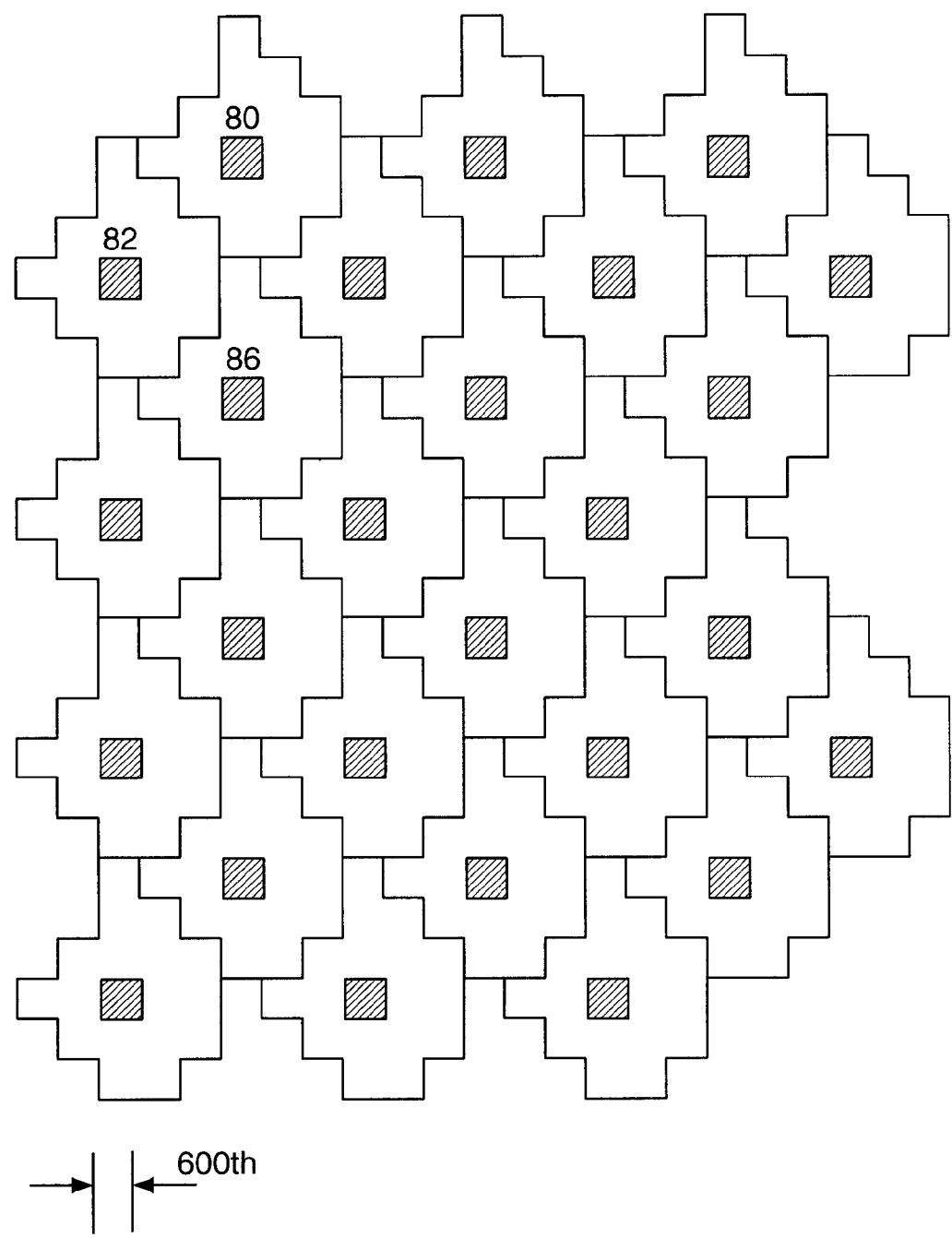
FIG. 8 is an illustration of a still darker shade of gray for a prior art "super dot" halftone cell.

The grayscale shade shown in FIG. 8 is not altered since the spacing between pixels 80, 82, 84, and 86 is already optimized. Another way to consider this case is that full size pixels 80–84 are "replaced" with pixels of four quarters the size.

The process then continues in a like fashion for the darker grayscale shades.

Although within the scope of this invention and although such a template matching process could continue to replace full size pixels representing every possible shade of gray in a bit map with the appropriate fractional sized pixels, it is much more convenient and preferred to use a bit map window based process in accordance with this invention as discussed with reference to FIGS. 9–20.

Figure 9:
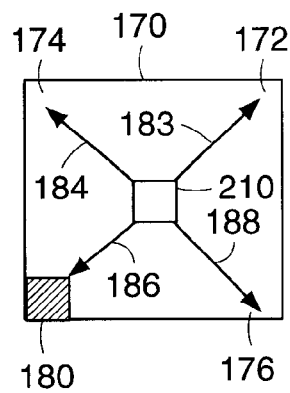
FIG. 9–20 are illustrations of the moving window and analysis computation steps of the grayscale enhancement method of this invention.

Accordingly there are some means for analyzing the state of selected pixels surrounding a subject pixel in a bit map such as window subsystem 170, FIG. 9 which forms a moving window within the source pixel-map. The window is typically an even number of pixels in the horizontal direction of the output scan and an odd number of pixels in the vertical direction. In the preferred embodiment, the window is 9 by 10 pixels with a total of 90 input pixels. The process of forming the moving window requires line stores if the source data is presented in raster-scan fashion, as is typical. In the case of a 9-line window, eight prior lines are stored. The ninth line is the currently inputting line and need not be stored. These line stores, known in the art, are a major portion of the gate count and system cost and can be lowered if multiple scan lines (not necessarily all 9) are accessed simultaneously from a source RAM. The exact size and shape of the window can be modified to accommodate the size and angle of the source halftone line screen and the systems ability to enhance several line screens. Further, it is desired to use a 45-degree screen rather than a 90-degree screen as discussed in FIGS. 1–8. The screen angle is important due to the fact that the human eye can see horizontal and vertical lines particularly well. For this reason, a pattern of halftone dots arranged at an angle of 90 degrees (vertical and horizontal rows of halftone dots) is most easily recognized and therefore tends to be visible. The least recognizable line screen pattern for printing is that with a raster angle of 45 degrees. In the preferred embodiment, shown in FIG. 9, the typical pixel arrangement for a 45 degree screen with the window subsystem is shown by selected pixels 174, 172, 176, 178, and 180. This set of selected pixels are intentionally off-set to the left in window 170 for reasons to be explained later.

Window 170, FIG. 9, traverses a bit map to analyze the state of selected pixels 172, 174, 176, and 178 surrounding "subject" pixel 210. Each pixel in the bit map eventually becomes a "subject" pixel due to movement of window 170 about the bit map. In this case, subject pixel 210 is white and selected surrounding pixels 172, 174, and 176 178 are white. Pixel 180, however, is black. In the preferred embodiment, window 170 is 9 by 10 pixels in area and the selected surrounding pixels 172, 174, 176, and 180 are all located at a predetermined set of vectors 182, 184, 186, and 188, respectively, with respect to subject pixel 210. Each vector has a length of $3\sqrt{2}$ pixels and is at different angle from the subject pixel within the window (e.g., 45°, 135°, 225°, and 315°).

Figure 10:
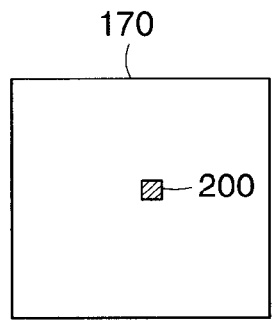

The number of black pixels present in the set comprising the subject pixel and the selected surrounding pixels is then computed. In this case, only one pixel is black, namely pixel 180. Then, instead of printing full size pixel 180, the modulator of the printer is driven to print fractional size pixel 200, FIG. 10 of approximately one fifth or twenty percent the size of full pixel 180. Fractional pixel 200 is printed on the printed page at a location corresponding to where original full size subject pixel 180, FIG. 9, was to be printed. The software, however, places fractional size pixel 200 in the center of window 170 as shown in FIG. 10.

Figure 11:
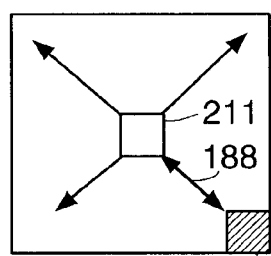

In FIG. 11, window 170 has traversed the bit map and is now analyzing new subject pixel 211. Prior black pixel 180 is now one of the selected pixels surrounding new subject pixel 211 since it is located at vector 188 with respect to new subject pixel 211.

Figure 12:
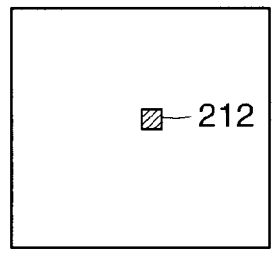

Again, there is now one black pixel out of five and fractional pixel 212, FIG. 12, twenty percent of the size of full pixel 180, is printed at a location corresponding to new subject pixel 210.

Figure 13:
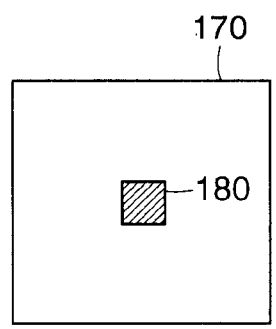
Figure 14:
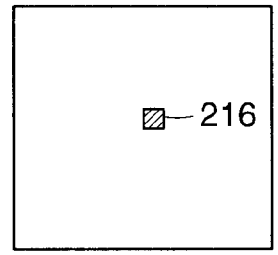

Window 170 continues to move until, as shown in FIG. 13, black pixel 180 is now the center "subject" pixel in window 170.Since there is again one black pixel out of five in window 170, fractional pixel 216, FIG. 14 is printed.

Figure 15:
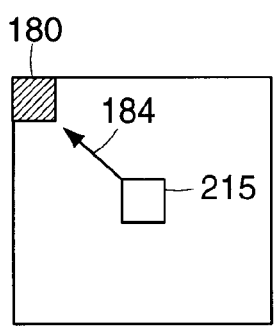
Figure 16:
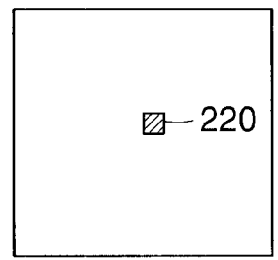
Figure 18:
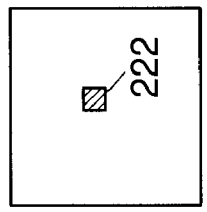
Figure 17:
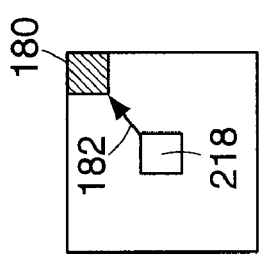

This process of analyzing the state of selected pixels surrounding a subject pixel within the window, computing the number of black pixels present for the total of the subject pixel combined with a selected surrounding pixels, and sending a signal to the modulator of a printer to print a fractional pixel continues until the window has completely traversed the bit map and each pixel and its surrounding selected pixels have been analyzing as shown in FIGS. 15–20. In FIG. 15, the window 170 has traversed the bit map and is analyzing subject pixel 215 when dark pixel 180 is at vector 184 from subject pixel 215. As a result, fractional twenty percent pixel 220, FIG. 16 is printed. In FIG. 17, window 117 has moved across the bit map and is analyzing subject pixel 218 and black pixel 180 now lies at vector 182 with respect to subject pixel 218. As a result, fractional twenty percent pixel 222 is printed, FIG. 18.

Figure 20:
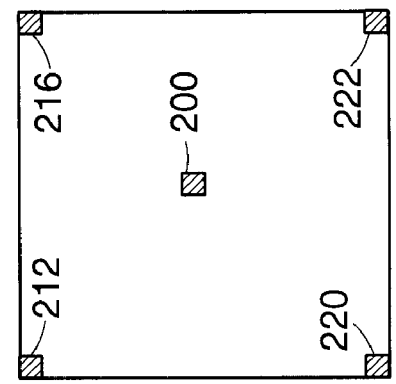
Figure 19:
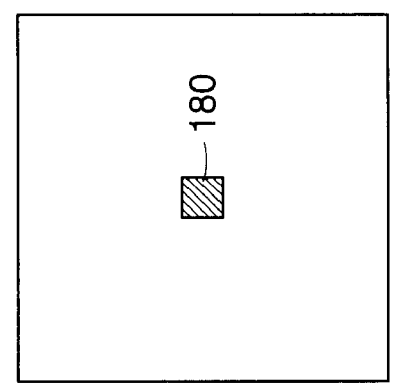

The result is that full size black pixel 180, FIG. 19, is "replaced" with one fifth size pixels 200, 212, 216, 220, 222, FIG. 20. The result is the same grayscale level since, when combined, the five fractional pixels total the size of full size pixel 180 and yet the amount of white space between these new fractional size pixels is greatly reduced thereby eliminating the mottling effect noticeable to the eye when looking at a printed page resulting from the lighter shades of gray achievable using prior art halftoning techniques.

Figure 21:
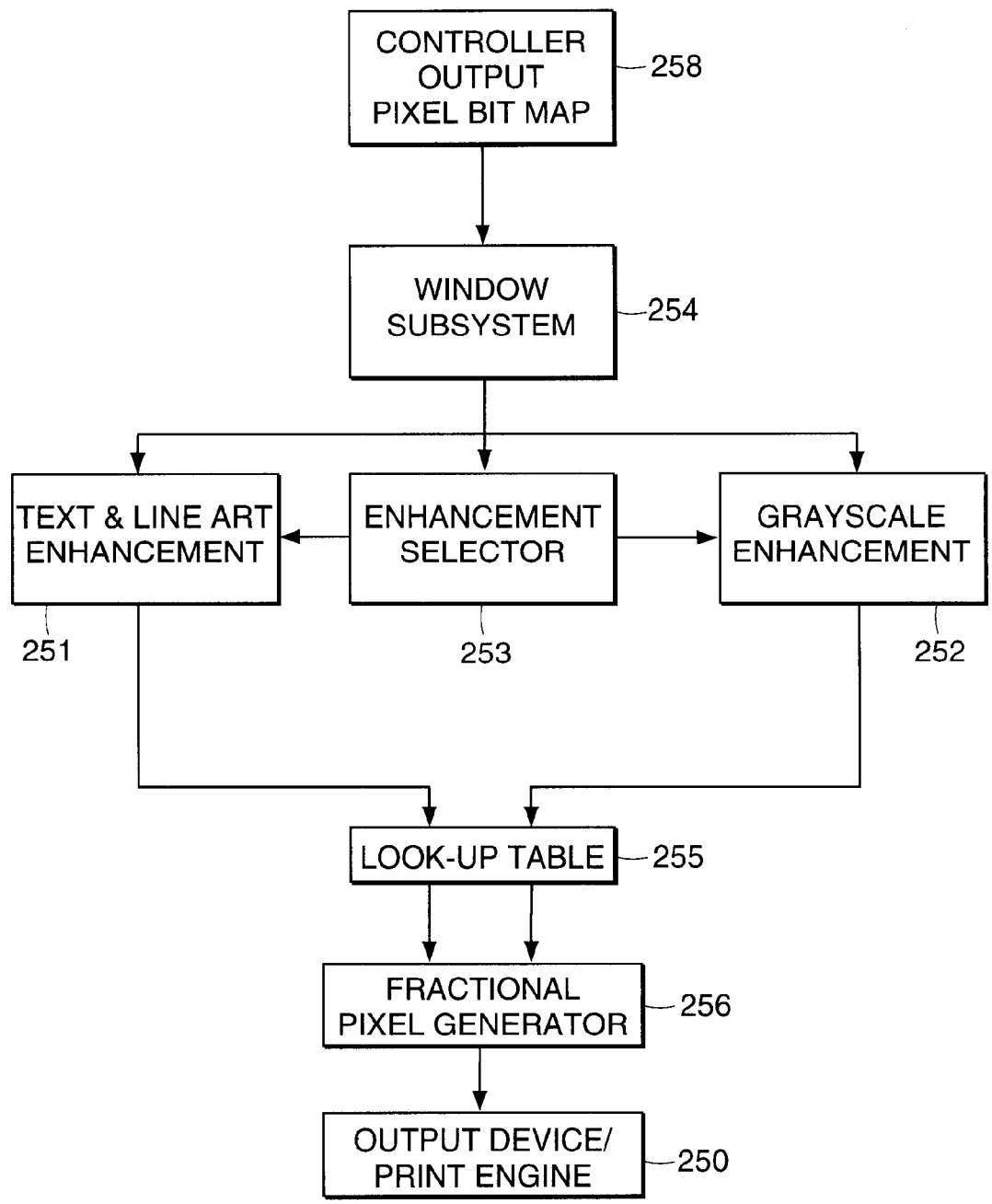
FIG. 21 is a block diagram showing the primary components of the grayscale enhancement system of this invention.
Figure 22:
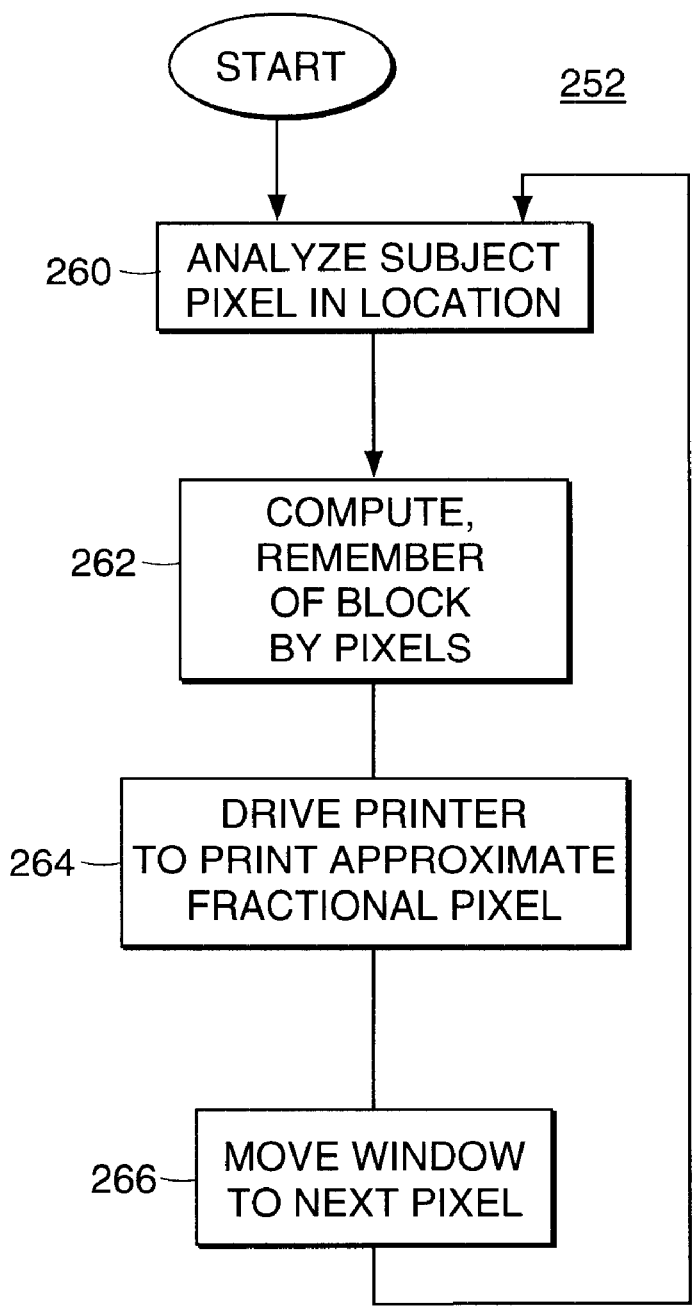
FIG. 22 is a flow chart of the grayscale enhancement routine operable in the system shown in FIG. 21 in accordance with this invention.

The primary components of this invention as shown in FIG. 21 include a window subsystem 254, which operates on the controller's output pixel bit map 258 and stores multiple scan lines of the serial input pixel bit-map. The window subsystem feeds enhancement selector 253 that determines whether the pixels in the window subsystem are likely to be a halftone or text/line-art. If enhancement selector 253 determines that the contents of the window subsystem 254 is likely to be text or line-art, then text and line-art enhancement subsystem 251 can be optionally used to operate on the window subsystem contents. When enhancement selector 253 determines that contents of window subsystem 254 is likely to be a halftone, then the grayscale enhancement subsystem 252 operates on the window subsystem 254. Operating grayscale enhancement subsystem 252 is responsive to enhancement selector 253 and window subsystem 254. The output of grayscale enhancement subsystem 252 is a signal presented via look-up table 225 to pixel generator 256 such as a modulator to print the appropriate fractional size pixels at their proper location. Generator 256 drives a printing device 250 such as a laser or ink jet print engine capable of sub-pixel modulation. Generator 256 may be a sub-pixel modulator such as Xerographic Laser Image's modulator model no. XLI-2050 or Analog Devices' AD9561 Pulse Width Modulator. The output of controller 258 is a standard serial video data stream which a page description language has generated. Grayscale enhancement subsystem 252 of this invention operates on that video data stream and is processed on-the-fly while the page is being printed. The output of subsystem 252 is an enhanced digital video signal presented to modulator 256 which drives the laser in the print engine. The means for determining from the selected pixels and the subject pixel, the number of black pixels may be grayscale enhancement system 252, FIG. 21 which operates in accordance with the flow chart shown in FIG. 22. As discussed above, a window is made to traverse a bit map to analyze each pixel which at one point in time is a "subject" pixel and certain selected pixels surrounding the subject pixel, step 260, to determine their state. In step 262, the number of pixels which are black of the subject pixel and the selected surrounding pixels is computed, and then a signal is generated, step 264, to drive the printer to print an appropriate fractional pixel related in size to the computed number of pixels which are black at the location of the subject pixel in the bit map. The window is now moved to the next pixel in the bit map which becomes a "subject" pixel, step 266 and processing returns to step 260.

Note, however, that the grayscale enhancement methodology described above is not always implemented for every pixel in a bit map. For example, text is not to be "enhanced" in accordance with this invention and therefore a routine, described below, is actually a precursor to step 260, FIG. 22.

Figure 23:
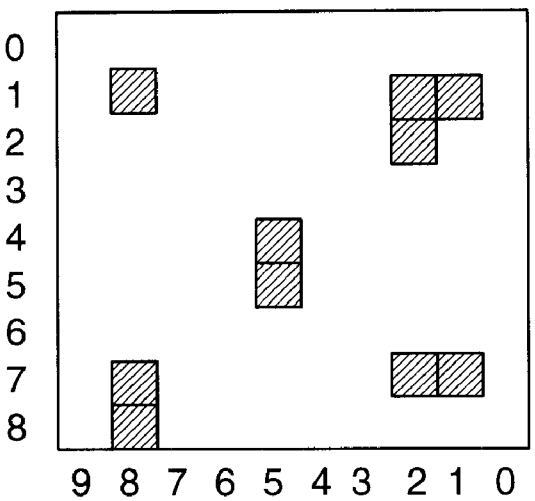
FIGS. 23–24 are conceptual illustrations of the windows created in accordance with the subject invention illustrating halftone images and text character or line edges, respectively.
Figure 24:
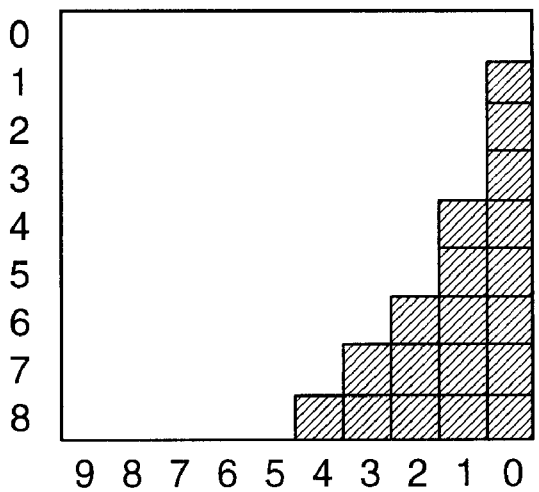

It is not desirable to modify pixels using the halftone enhance algorithm of this invention when text or line-art is to be printed. Halftone dots are always separated by a distance "d" from each other and that distance forms the basis for making a decision by the examination of the window for multiple pixels within the halftone cell that are separated by a distance less than "d". When such an occurrence is present, the halftone enhancement of this invention is turned off, and if present in the system, an edge enhancement algorithm is turned on. FIG. 23 shows typical areas of the window where black pixels may be present that give a high likelihood of halftone images being present. FIG. 24 shows the content of a typical window when a text character or line edge is present.

The undesirable "mottling" effect in images occurs mainly in a highlight area (light areas of images such as facial tones) of photo images. When highlight areas of images are detected, the halftone enhancement algorithm of this invention is turned on. This condition is readily determined by checking certain black pixels within a halftone cell and determining if the state has exceeded a predetermined threshold.

Appendix A depicts the actual logical operations of the "enhancement selector" in the preferred embodiment for the "left window" analysis to determine whether halftone dots are present. The equivalent analysis is done for the "right window" analysis. If the logical operations detect a halftone in either the "left window" analysis. If the logical operations detect a halftone in either the "left window" OR "right window", then halftone dots are assumed to be present thus allowing the rendering system to execute its sub-pixel distribution for "grayscale enhancement" to "smooth" the image by increasing the number of gray levels in an image and therefore significantly reducing the "mottling" effect in photo images.

The grayscale enhancement technique described above has been applied to a 141 dpi line screen with 144 shades of gray printed on a standard 600 dpi laser printer. The quality achieved approaches magazine quality and matches or surpasses other multi-bit image enhancement techniques that require more memory, software modifications and increases in processing requirements—all of which result in poorer performance and/or increases in controller costs. The enhancement method of this invention works with existing printer software and may be integrated with text and line-art enhancement to produce a total package for producing quality text, line-art and photo images.

Although specific features of this invention are shown in some drawings and not others, this is for convenience only as each feature may be combined with any or all of the other features in accordance with the invention.

Other embodiments will occur to those skilled in the art and are within the following claims:

APPENDIX A

```
--
-- The 1-bit grayscale enhancement entity
--
--
--        0     1     2     3     4     5
--   0   000,  220,  221,  222,  223,  224,
--   1   220,  225,  226,  227,  228,  229,
--   2   221,  226,  230,  231,  232,  233,
--   3   222,  227,  231,  234,  235,  236,
--   4   223,  228,  232,  235,  237,  238,
--   5   224,  229,  233,  236,  238,  000,
LIBRARY ieee;
USE ieee.std_logic_1164.ALL;
ENTITY GrayIBit IS
    PORT (bmc0   :  IN   STD_LOGIC_VECTOR(0 TO 8); -- Bitmap column0 -- RIGHT MC
          bmc1   :  IN   STD_LOGIC_VECTOR(0 TO 8); -- Bitmap column1
          bmc2   :  IN   STD_LOGIC_VECTOR(0 TO 8); -- Bitmap column2
          bmc3   :  IN   STD_LOGIC_VECTOR(0 TO 8); -- Bitmap column3
          bmc4   :  IN   STD_LOGIC_VECTOR(0 TO 8); -- Bitmap column4
          bmc5   :  IN   STD_LOGIC_VECTOR(0 TO 8); -- Bitmap column5
          bmc6   :  IN   STD_LOGIC_VECTOR(0 TO 8); -- Bitmap column6
          bmc7   :  IN   STD_LOGIC_VECTOR(0 TO 8); -- Bitmap column7
          bmc8   :  IN   STD_LOGIC_VECTOR(0 TO 8); -- Bitmap column8
          bmc9   :  IN   STD_LOGIC_VECTOR(0 TO 8); -- Bitmap column9 -- LEFT MOST
          clk    :  IN   STD_LOGIC; -- Clock
          Gcase  :  OUT  STD_LOGIC_VECTOR(0 TO 18);
          GrayDetected : OUT STD_LOGIC; -- Set when we should over-ride the edge d
          Gsymmetry: OUT STD_LOGIC
    );
END GrayIBit;
ARCHITECTURE structural OF GrayIBit IS
SIGNAL LeftCount : STD_LOGIC_VECTOR(0 TO 5); -- value is not binary encoded
SIGNAL RightCount : STS_LOGIC_VECTOR(0 TO 5); -- same as above
SIGNAL LeftGrayDetected : STD_LOGIC;
SIGNAL RightGrayDetected : STS_LOGIC;
SIGNAL iGrayDetected : STD LOGIC;        -- need an internal version of this
SIGNAL iGsymetry : STD_LOGIC;
SIGNAL xGsymmetry : STD_LOGIC;
SIGNAL iGcase : STD_LOGIC_VECTOR(0 to 18);
SIGNAL LA2 : STD_LOGIC;
SIGNAL LA1 : STD_LOGIC;
SIGNAL LA0 : STD_LOGIC;
SIGNAL LB2 : STD_LOGIC;
SIGNAL LB1 : STD_LOGIC;
SIGNAL LB0 : STD_LOGIC;
SIGNAL LC4 : STD_LOGIC;
SIGNAL LC3 : STD_LOGJC;
SIGNAL LC2 : STD_LOGIC;
SIGNAL LC1 : STD_LOGIC;
```

-continued

APPENDIX A

```
SIGNAL LC0 : STD_LOGIC;
SIGNAL RA2 : STD_LOGIC;
SIGNAL RA1 : STD_LOGIC;
SIGNAL RA0 : STD_LOGIC;
SIGNAL RB2 : STD_LOGIC;
SIGNAL RB1 : STD_LOGIC;
SIGNAL RB0 : STD_LOGIC;
SIGNAL RC4 : STD_LOGIC;
SIGNAL RC3 : STD_LOGIC;
SIGNAL RC2 : STD_LOGIC;
SIGNAL RC1 : STD_LOGIC;
SIGNAL RC0 : STD_LOGIC;
BEGIN -- {
--   bmc   9  8  7   6  5  4   3  2  1   0
--   0                o  o  o
--   1           1    r  o  o  o     1   r
--   2                o  o  o
--   3     o  o  o             o  o  o
--   4     o  o  o    L  R     o  o  o
--   5     o  o  o             o  o  o
--   6                o  o  o
--   7           1    r  o  o  o     1   r
--   8                o  o  o
LeftGrayDetected <= '0'
  WHEN (
    -- If certain pixels are black, then no grayscale enhancement.
    bmc6(0) = '1' OR bmc5(0) = '1' OR bmc4(0) = '1' OR
    bmc6(1) = '1' OR bmc5(1) = '1' OR bmc4(1) = '1' OR
    bmc6(2) = '1' OR bmc5(2) = '1' OR bmc4(2) = '1' OR
    bmc6(6) = '1' OR bmc5(6) = '1' OR bmc4(6) = '1' OR
    bmc6(7) = '1' OR bmc5(7) = '1' OR bmc4(7) = '1' OR
    bmc6(8) = '1' OR bmc5(8) = '1' OR bmc4(8) = '1' OR
    bmc9(3) = '1' OR bmc8(3) = '1' OR bmc7(3) = '1' OR bmc3(3) = '1' OR bmc2(3)
    bmc9(4) = '1' OR bmc8(4) = '1' OR bmc7(4) = '1' OR bmc3(4) = '1' OR bmc2(4)
    bmc9(5) = '1' OR bmc8(5) = '1' OR bmc7(5) = '1' OR bmc3(5) = '1' OR bmc2(5)
    (bmc5(4) = '0' AND -- if middle pixel is white . . .
      (
      -- If just one corner is set, make sure that no adjacent pixels are set.
      (bmc8(1) = '1' AND (bmc9(0) = '1' OR bmc8(0) = '1' OR bmc9(1) = '1' ) AND
ND bmc2(7) = '0')
      OR
      (bmc8(1) = '0' AND bmc2(1) = '1' AND (bmc2(0) = '1' OR bmc1(0) = '1' OR b
ND bmc2(7) = '0')
      OR
      (bmc8(1) = '0' AND bmc2(1) = '0' AND bmc8(7) = '1' AND (bmc9(8) = '1' OR
ND bmc2(7) = '0')
      OR
      (bmc8(1) = '0' AND bmc2(1) = '0' AND bmc8(7) = '0' AND bmc2(7) = '1' AND
OR bmc1(8) = '1'))
        OR
      -- if exactly two corners are set and they are adjacent, then this is tex
      (bmc8(1) = '1' AND bmc2(1) = '1' AND bmc8(7) = '0' and bmc2(7) = '0')
      OR
      (bmc8(1) = '0' AND bmc2(1) = '1' AND bmc8(7) = '0' and bmc2(7) = '1')
      OR
      (bmc8(1) = '0' AND bmc2(1) = '0' AND bmc8(7) = '1' and bmc2(7) = '1')
      OR
      (bmc8(1) = '1' AND bmc2(1) = '0' AND bmc8(7) = '1' and bmc2(7) = '0')
      )
    )
  )
ELSE
'1';
RightGrayDetected <= '0'
WHEN (
    -- If certain pixels are black, then no grayscale enhancement.
    bmc5(0) = '1' OR bmc4(0) = '1' OR bmc3(0) = '1' OR
    bmc5(1) = '1' OR bmc4(1) = '1' OR bmc3(1) = '1' OR
    bmc5(2) = '1' OR bmc4(2) = '1' OR bmc3(2) = '1' OR
    bmc5(6) = '1' OR bmc4(6) = '1' OR bmc3(6) = '1' OR
    bmc5(7) = '1' OR bmc4(7) = '1' OR bmc3(7) = '1' OR
    bmc5(8) = '1' OR bmc4(8) = '1' OR bmc3(8) = '1' OR
    bmc8(3) = '1' OR bmc7(3) = '1' OR bmc6(3) = '1' OR bmc2(3) = '1' OR bmc1(3
    bmc8(4) = '1' OR bmc7(4) = '1' OR bmc6(4) = '1' OR bmc2(4) = '1' OR bmc1(4
    bmc8(5) = '1' OR bmc7(5) = '1' OR bmc6(5) = '1' OR bmc2(5) = '1' OR bmc1(5
    (bmc4(4) = '0' AND -- if middle pixel is white . . .
      (
```

-continued

APPENDIX A

```
    -- If just one corner is set, make sure that no adjacent pixels are set.
    (bmc7(1) = '1' AND (bmc8(0) = '1' OR bmc7(0) = '1' OR bmc8(1) = '1') AND
ND bmc1(7) = '0')
    OR
    (bmc7(1) = '0' AND bmc1(1) = '1' AND (bmc1(0) = '1' OR bmc0(0) = '1' OR b
ND bmc1(7) = '0')
    OR
    (bmc7(1) = '0' AND bmc1(1) = '0' AND bmc7(7) = '1' AND (bmc8(8) = '1' OR
ND bmc1(7) = '0')
    OR
    (bmc7(1) = '0' AND bmc1(1) = '0' AND bmc7(7) = '0' AND bmc1(7) = '1' AND
OR bmc0(8) = '1'))
    OR
    -- if exactly two corners are set and they are adjacent, then this is tex
    (bmc7(1) = '1' AND bmc1(1) = '1' AND bmc7(7) = '0' and bmc1(7) = '0')
    OR
    (bmc7(1) = '0' AND bmc1(1) = '1' AND bmc7(7) = '0' and bmc1(7) = '1' )
    OR
    (bmc7(1) = '0' AND bmc1(1) = '0' AND bmc7(7) = '1' and bmc1(7) = '0')
    OR
    (bmc7(1) = '1' AND bmc1(1) = '0' AND bmc7(7) = '1' and bmc1(7) = '0')
    )
  )
)
ELSE
'1';
--   This has to count how many of the 5 pixels are set!
--   counting is not easy, so I broke it into three stages:
--      The first stage combines two source pixels to counts of either 0, 1, or
--        The second stage takes those results to counts of 0–4
--      and the thrid stage adds the center pixel for counts of 0–5
LA2 <= bmc8(1) AND bmc8(7); -- set if count is 2
LA1 <= bmc8(1) XOR bmc8(7); -- set if count is 1
LA0 <= NOT bmc8(1) AND NOT bmc8(7);
LB2 <= bmc2(1) AND bmc2(7); -- Set if count is 2
LB1 <= bmc2(1) XOR bmc2(7); -- set if count is 1
LB0 <= NOT bmc2(1) AND NOT bmc2(7);
LC4 <= LA2 AND LB2;
LC3 <= (LA2 AND LB1) OR (LA1 AND LB2);
LC2 <= (LA2 AND LB0) OR (LB2 AND LA0) OR (LA1 AND LB1);
LC1 <= (LA1 AND LB0) OR (LB1 AND LA0);
LC0 <= LA0 AND LB0;
LeftCount(0) <= LC0 AND NOT bmc5(4);
LeftCount(1) <= (LC0 AND bmc5(4)) OR (LC1 AND NOT bmc5(4));
LeftCount(2) <= (LC1 AND bmc5(4)) OR (LC2 AND NOT bmc5(4));
LeftCount(3) <= (LC2 AND bmc5(4)) OR (LC3 AND NOT bmcs(4));
LeftCount(4) <= (LC3 AND bmc5(4)) OR (LC4 AND NOT bmc5(4));
LeftCount(5) <= LC4 AND bmc5(4);
RA2 <= bmc7(1) AND bmc7(7); -- set if count is 2
RA1 <= bmc7(1) XOR bmc7(7); -- set if count is 1
RA0 <= NOT bmc7(1) AND NOT bmc7(7);
RB2 <= bmc1(1) AND bmc1(7); -- Set if count is 2
RB1 <= bmc1(1) XOR bmc1(7); -- set if count is 1
RB0 <= NOT bmc1(1) AND NOT bmc1(7);
RC4 <= RA2 AND RB2;
RC3 <= (RA2 AND RB1) OR (RA1 AND RB2);
RC2 <= (RA2 AND RB0) OR (RB2 AND RA0) OR (RA1 AND RB1);
RC1 <= (RA1 AND RB0) OR (RB1 AND RA0);
RC0 <= RA0 AND RB0;
RightCount(0) <= RC0 AND NOT bmc4(4);
RightCount(1) <= (RC0 AND bmc4(4)) OR (RC1 AND NOT bmc4(4));
RightCount(2) <= (RC1 AND bmc4(4)) OR (RC2 AND NOT bmc4(4));
RightCount(3) <= (RC2 AND bmc4(4)) OR (RC3 AND NOT bmc4(4));
RightCount(4) <= (RC3 AND bmc4(4)) OR (RC4 AND NOT bmc4(4));
RightCount(5) <= RC4 AND bmc4(4);
-- A valid 1-bit grayscale case is when either left or right is detected, b
-- not if both sides have all 5 pixels black.
iGrayDetected <= (RightGrayDetected AND NOT RightCount(0) AND NOT RightCoun
AND NOT LeftCount(0) AND NOT LeftCount(5));
-- The symmetry only matters for the non-equal count pairs, but we always c
-- Simply, the bit is set when the right count is greater than or equal to
iGsymmetry <= RightCount(5) OR
        (NOT Leftcount(5) AND
         (RightCount(4) OR
            (NOT Leftcount(4) AND
             (Rightcount(3) OR
                (NOT Leftcount(3) AND
```

-continued

APPENDIX A

```
                    (Rightcount(2) OR
                       (NOT Leftcount(2) AND
                          RightCount(1))))))));
-- Outside of this module, the case numbers start at 220. Inside they star
-- This table is the count of black pixels for each of the two center pixel
-- So if the left pixel count is 3 and the right count is 1, that is a case
--         0    1    2    3    4    5
--
--   0    —    0    1    2    3    4
--   1    0    5    6    7    8    9
--   2    1    6   10   11   12   13
--   3    2    7   11   14   15   16
--   4    3    8   12   15   17   18
--   5    4    9   13   16   18    —
-- Cases 5, 10, 14, and 17 have the same count from each side, so they are
iGcase(5)  <= iGrayDetected AND Leftcount(1) AND Rightcount(1);
iGcase(10) <= iGrayDetected AND Leftcount(2) AND RightCount(2);
iGcase(14) <= iGrayDetected AND LeftCount(3) AND RightCount(3);
iGcase(17) <= iGrayDetected AND LeftCount(4) AND RightCount(4);
--The remaining cases have two possible counts that hit.
iGcase(0)  <= iGrayDetected AND ((LeftCount(1) AND RightCount(0)) OR (LeftCc
iGcase(1)  <= iGrayDetected AND ((LeftCount(2) AND RightCount(o)) OR (LeftCc
iGcase(2)  <= iGrayDetected AND ((LeftCount(3) AND RightCount(())) OR (LeftCc
iGcase(3)  <= iGrayDetected AND ((LeftCount(4) AND RightCount(0)) OR (LeftCc
iGcase(4)  <= iGrayDetected AND ((LeftCount(5) AND RightCount(0)) OR (LeftCc
iGcase(6)  <= iGrayDetected AND ((LeftCount(2) AND RightCount(1)) OR (LeftCc
iGcase(7)  <= iGrayDetected AND ((LeftCount(3) AND RightCount(1)) OR (LeftCc
iGcase(8)  <= iGrayDetected AND ((LeftCount(4) AND RightCount(1)) OR (LeftCc
iGcase(9)  <= iGrayDetected AND ((LeftCount(5) AND RightCount(1)) OR (LeftCc
iGcase(11) <= iGrayDetected AND ((LeftCount(3) AND RightCount(2)) OR (LeftC
iGcase(12) <= iGrayDetected AND ((LeftCount(4) AND RightCount(2)) OR (LeftC
iGcase(13) <= iGrayDetected AND ((LeftCount(5) AND RightCount(2)) OR (LeftC
iGcase(15) <= iGrayDetected AND ((LeftCount(4) AND RightCount(3)) OR (LeftC
iGcase(16) <= iGrayDetected AND ((Leftcount(5) AND RightCount(3)) OR (LeftC
iGcase(18) <= iGrayDetected AND ((LeftCount(5) AND RightCount(4)) OR (LeftC
singlebitgray: PROCESS
    BEGIN -- {
    WAIT UNTIL clk'EVENT AND (clk = '1');
    GrayDetected <= iGrayDetected;
    xGsymmetry <= iGsymmetry;
    Gsymmetry <= xGsymmetry;
--      LatchCase: FOR n IN 0 to 18 GENERATE
--          Gcase(n) <= iGcase(n);
--      END GENERATE LatchCase;
    Gcase(0) <= iGcase(0);
    Gcase(1) <= iGcase(1);
    Gcase(2) <= iGcase(2);
    Gcase(3) <= iGcase(3);
    Gcase(4) <= iGcase(4);
    Gcase(5) <= iGcase(5);
    Gcase(6) <= iGcase(6);
    Gcase(7) <= iGcase(7);
    Gcase(8) <= iGcase(8);
    Gcase(9) <= iGcase(9);
    Gcase(10) <= iGcase(10);
    Gcase(11) <= iGcase(11);
    Gcase(12) <= iGcase(12);
    Gcase(13) <= iGcase(13);
    Gcase(14) <= iGcase(14);
    Gcase(15) <= iGcase(15);
    Gcase(16) <= iGcase(16);
    Gcase(17) <= iGcase(17);
    Gcase(18) <= iGcase(18);
END PROCESS singlebitgray; -- }
END structural; -- }
```

What is claimed is:

1. A grayscale enhancement method comprising:
analyzing the state of selected pixels surrounding a subject pixel in a bit map;
determining the number of selected pixels including the subject pixel that are black; and
printing a fractional pixel in each of a plurality of halftone cells, the fractional pixels being related in size to at least the computed number of pixels which are black.

2. The method of claim 1 in which the step of analyzing includes generating a window which moves about the bit map.

3. The method of claim 2 in which the window is nine by ten pixels in area.

4. The method of claim 2 in which the selected surrounding pixels are located at a predetermined set of vectors with respect to the subject pixel within the window.

5. The method of claim 4 in which the predetermined set of vectors each have a length n.

6. The method of claim 5 in which n is 3√2 pixels.

7. The method of claim 4 in which each vector extends to a different corner of the window.

8. The method of claim 1 in which m pixels are selected as the surrounding pixels and printing includes driving a printer modulator to print a pixel of a size approximately x/(m+1) where x is the number of black pixels present in a set including the m surrounding pixels and the subject pixel.

9. The method of claim 8 in which m equals 4.

10. A grayscale enhancement system comprising:

means for analyzing the state of selected pixels surrounding a subject pixel in a bit map;

means for determining, from the selected pixels and the subject pixel, the number of black pixels; and means for printing a fractional pixel in each of a plurality of halftone cells, the fractional pixels being related in size to at least the respective computed number of pixels which are black.

11. The system of claim 10 in which the means for analyzing includes means for generating a window which moves about the bit map.

12. The system of claim 11 in which the window is nine by ten pixels in area.

13. The system of claim 11 in which the means for analyzing further includes means for selecting surrounding pixels that are located at a predetermined set of vectors with respect to the subject pixel within the window.

14. The system of claim 13 in which the predetermined set of vectors each have a length n.

15. The system of claim 14 in which n is 3√2 pixels.

16. The system of claim 13 in which each vector extends to a different corner of the window.

17. The system of claim 10 in which printing includes driving a printer modulator to print a pixel of a size approximately x/(m+1) where x is the number of black pixels present in a set including m surrounding pixels and the subject pixel.

18. The system of claim 17 in which m equals 4.

19. A grayscale enhancement method comprising:

generating a window for determining selected pixels in a bit map located at a predetermined set of vectors of length of 3√2 pixels with respect to a subject pixel within the window;

applying the window to a subject pixel in the bit map to generate the selected pixels;

analyzing the state of the selected pixels;

determining the number of selected pixels including the subject pixel which are black; and printing, at a location corresponding to the location of the subject pixel in the bit map, a fractional pixel related in size to at least the computed number of pixels which are black.

20. A grayscale enhancement method comprising:

analyzing the state of m selected pixels surrounding a subject pixel in a bit map;

determining the number of the m selected pixels including the subject pixel that are black; and driving a printer modulator to print, at a location corresponding to the location of the subject pixel in the bit map, a pixel of a size approximately x/(m+1) where x is the number of black pixels present in a set including the m surrounding pixels and the subject pixel.

21. The method of claim 20 in which m equals 4.

22. A grayscale enhancement system comprising:

means for generating a window for determining selected pixels in a bit map located at a predetermined set of vectors of length of 3√2 pixels with respect to a subject pixel within the window;

means for applying the window to a subject pixel in the bit map to generate the selected pixels;

means for analyzing the state of the selected pixels;

means for determining the number of selected pixels including the subject pixel which are black; and means for printing, at a location corresponding to the location of the subject pixel in the bit map, a fractional pixel related in size to at least the computed number of pixels which are black.

23. A grayscale enhancement system comprising:

means for analyzing the state of m selected pixels surrounding a subject pixel in a bit map;

means for determining the number of the m selected pixels including the subject pixel that are black; and means for driving a printer modulator to print, at a location corresponding to the location of the subject pixel in the bit map, a pixel of a size approximately x/(m+1) where x is the number of black pixels present in a set including the m surrounding pixels and the subject pixel.

24. The system of claim 23 in which m equals 4.

* * * * *